Figure 1:
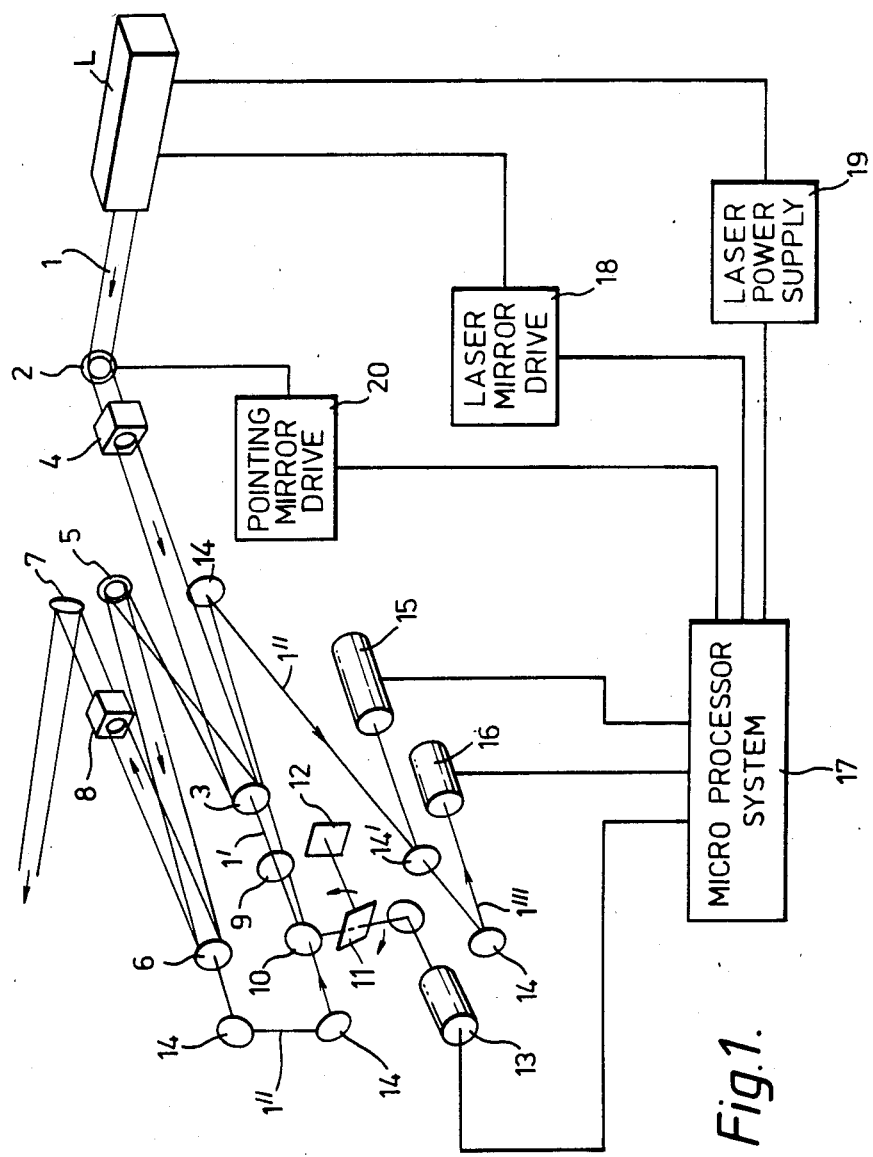

United States Patent [19]
Travis

[11] Patent Number: 4,707,836
[45] Date of Patent: Nov. 17, 1987

[54] LASER CONTROL SYSTEM
[75] Inventor: Alan J. B. Travis, Abingdon, England
[73] Assignee: United Kingdom Atomic Energy Authority, London, England
[21] Appl. No.: 764,643
[22] Filed: Aug. 12, 1985
[30] Foreign Application Priority Data
Aug. 16, 1984 [GB] United Kingdom ............ 8420861
[51] Int. Cl.$^4$ .......................................... H01S 3/13
[52] U.S. Cl. .................................... 372/29; 372/31
[58] Field of Search ............................ 372/29, 31, 32
[56] References Cited
U.S. PATENT DOCUMENTS
4,329,659  5/1982  Chen ................................ 372/29

Primary Examiner—Gene Wan
Attorney, Agent, or Firm—William R. Hinds

[57] ABSTRACT

For monitoring and controlling a laser beam, sample beams are monitored for three characteristics and the three monitor outputs are used to control the beam generation. The three characteristics monitored are the transverse distribution of energy within the beam (a) under far field conditions and (b) under near field conditions, and (c) total power within a known proportion of the beam. These are employed respectively to control (a) the position of a mirror which forms part of an optical cavity within the laser structure, (b) a beam pointing element, (c) a beam expander and (d) a power supply for the laser.

7 Claims, 8 Drawing Figures

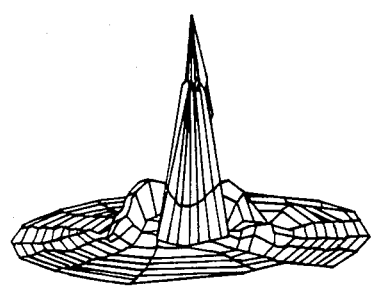
Fig. 3 a)  FAR FIELD INTENSITY PROFILE.
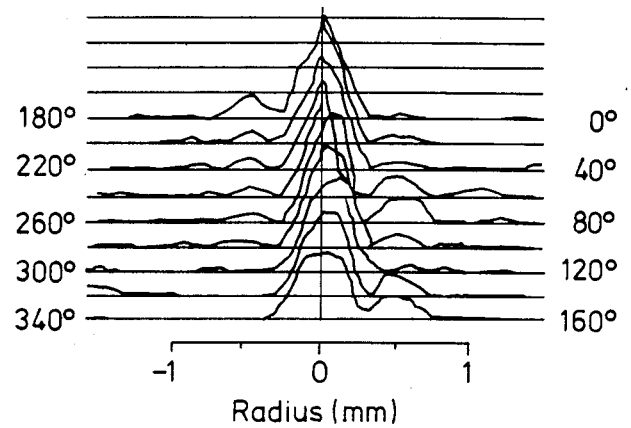
Fig. 3 b) RADIAL PLOT.
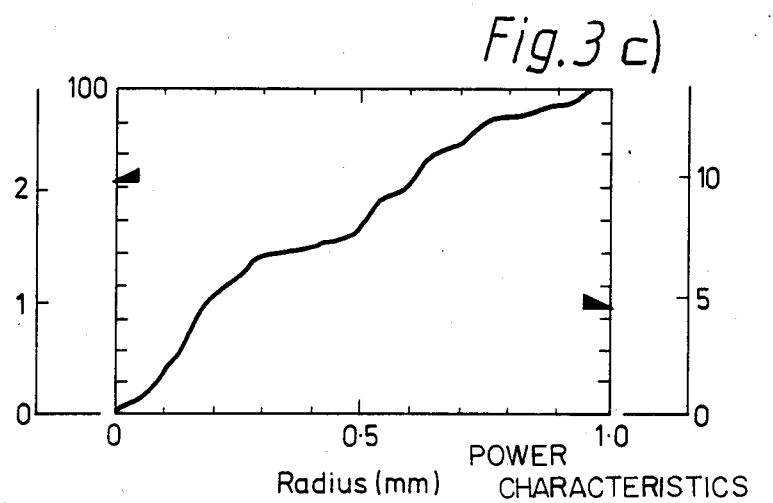
Fig. 3 c) POWER CHARACTERISTICS

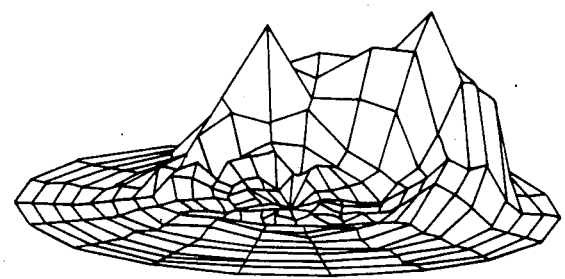
Fig. 5 a) NEAR FIELD INTENSITY PROFILE.
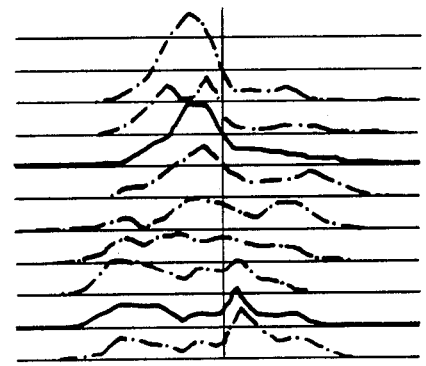
Fig. 5 b) NEAR FIELD MONITOR RADIAL PLOT.

LASER CONTROL SYSTEM

The present invention relates to the control of the quality of a laser beam.

Lasers are becoming used more and more in industry in circumstances where it is of the greatest importance that the maximum use is made of the power which is available, nominally, from the laser. To do this it is necessary to monitor continuously the laser beam quality, and alter the operating parameters of the laser to maximise the usable power in the laser beam.

According to the present invention there is provided an apparatus for monitoring and controlling a beam of radiation from a laser, comprising means for directing at least a portion of the laser beam at a means for determining the transverse distribution of energy within the laser beam under near field conditions and producing a first control signal related thereto, means for directing a second portion of the laser beam at a means for determining the transverse distribution of energy within the laser beam under far field conditions and producing a second control signal related thereto, and means for directing a known proportion of the laser beam at a means for measuring the total power within the said proportion of the laser beam and producing a third control signal related thereto, means responsive to the first control signal to alter the position of a mirror which forms part of an optical cavity within the laser structure, means responsive to the first and second control signals, to direct the laser beam along a predetermined path, means responsive to the second control signal to maintain the divergence of the laser beam within predetermined limits, and means responsive to the third control signal to vary the amount of power supplied to the laser.

The invention will now be described by way of example, with reference to the accompanying drawings, in which:

FIG. 1 is a schematic diagram of an embodiment of the invention.

Figure 2:
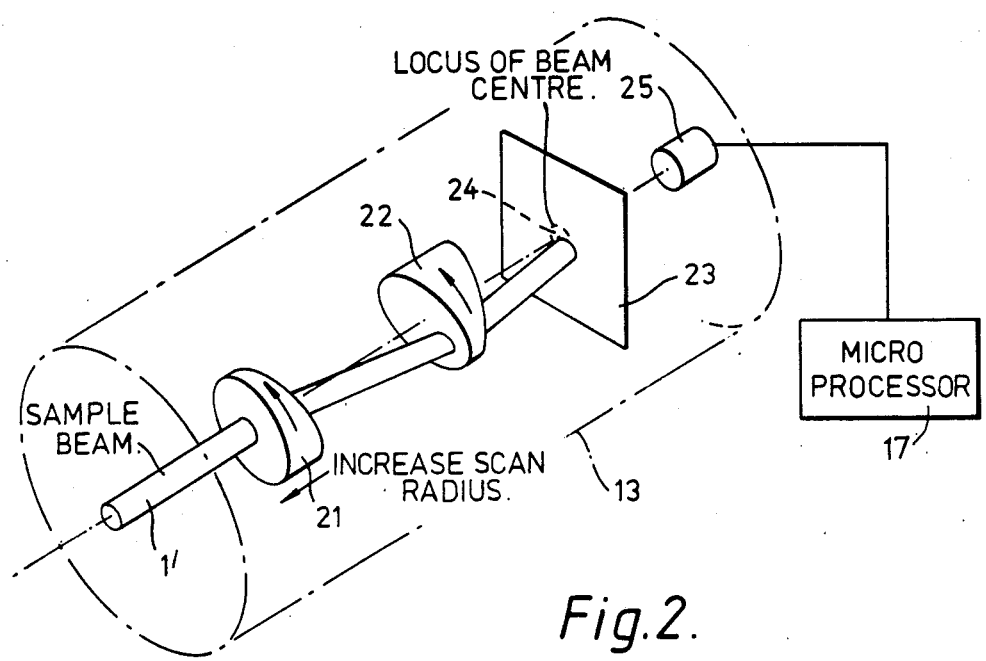
Figure 4:
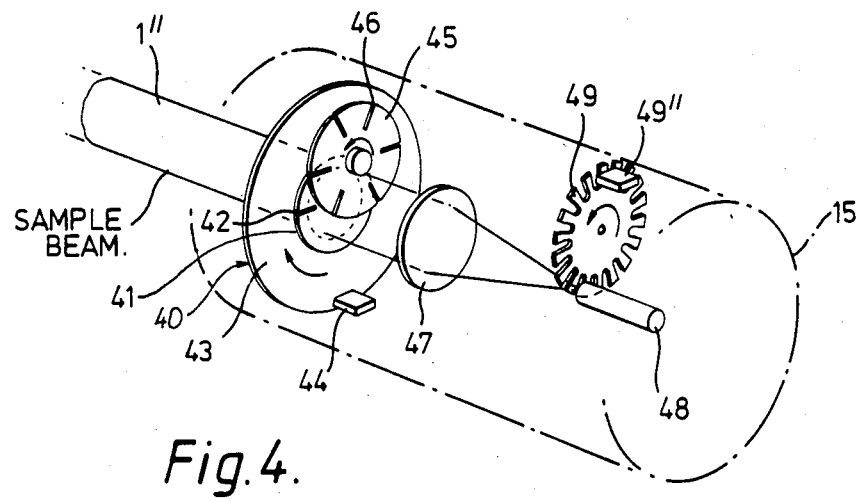

FIG. 2 illustrates schematically the action of a component of the embodiment of FIG. 1 for measuring the transverse distribution of energy across a laser beam under far field conditions, FIGS. 3a-3c show three ways of displaying the characteristics of the beam under far field conditions, FIG. 4 illustrates schematically the action of a component of the embodiment of FIG. 1 for measuring the transverse distribution of energy across a laser beam under near field conditions, and FIGS. 5a and 5b show typical plots of the transverse variation in energy across a laser beam under near field conditions.

Referring to the drawings. FIG. 1 shows schematically the optical arrangement of a laser beam diagnostic system. A laser beam 1 from a laser L is diverted by an input mirror 2 to a beam expander mirror 3 via a safety isolator 4. The beam expander mirror 3 reflects the laser beam 1 to a second beam expander mirror 5. The beam expander mirror 5 reflects the laser beam 1 to a partially transmitting mirror 6, whence the major part is reflected to an output mirror 7 via an output shutter 8, and thence to a work station, which is not shown.

The beam expander mirror 3 has a rectangular matrix of bales formed in it, so that in effect the laser beam 1 is sampled spatially. Light passing through the beam expander mirror 3 passes through an imaging lens 9 to a beam folding mirror 10 and a switching mirror 11. The switching mirror 11 directs the laser beam sample 1' to a sheet of plastic 12, upon which it is brought to a focus and produces a burn pattern corresponding to the distribution of energy in the original laser beam 1. Alternatively, the switching mirror 11 directs the laser beam sample 1' to a far field monitor 13, to be described later. The portion 1" of the laser beam 1 which is transmitted by the mirror 6 is directed by a series of mirrors 14, one of which 14', is partially reflecting only, to a near field monitor 15, and a power monitor 16, both of which will be described later. The far field monitor 13 and near field monitor 15 have their operating sequences, data aquisition, storage, processing and display controlled by a microprocessor based system 17 which also generates control signals for a drive system 18 for a mirror (not shown) which form of part of the optical cavity of the laser, and a laser power supply 19 and pointing mirror drive 20.

Referring to FIGS. 2 and 3, the far field monitor 15 consists of a pair of optical wedges 21 and 22 which are arranged to rotate around a common axis. The angle of the wedge 21 is less than that of the wedge 22. Their apices lie in the same plane but on opposite sides of their axis of rotation. The wedge 21 also can be moved axially with respect to the wedge 22. A detector plane 23 has a hole 24 some 20 $\mu$m in diameter centred on the axis of rotation of the wedges 21 and 22. Behind the detector plane 23 is a pyroelectric detector 25. Initially the wedges 21 and 22 are positioned so that the sampled laser beam 1' is stationary and centred on the hole 24 in the detector plane 23. The wedges 21 and 22 are set in motion, the wedge 21 being reciprocated axially with respect to the wedge 22, as well as being rotated. As the wedge 21 moves away from the wedge 22, the sampled laser beam 1' is caused to travel in a spiral path around the hole 24, in turn causing the sampled beam 1' effectively to travel in a spiral path on the cross-section of the sampled laser beam 1'. The output from the detector 25 is digitised at regular intervals by the microprocessor system 17 so as to produce 16 digitised beam samples along each of 18 radii.

Quantitative analysis of the output of the detector 25 gives graphical displays such as those shown in FIG. 3. The display 3(a) is self explanatory. The radial plot 3(b) is a series of intensity profiles across each of the nine diameters contained in the spiral scan of the sampled laser beam 1'. This form of display clearly shows the diffraction rings and their intensity relative to the central peak, the position of the centre of the sampled laser beam 1', and hence the main laser beam 1, and any variations in the axial symmetry of the laser beam 1. The power characteristic display 3(c) shows the enclosed power as a function of the radius. Two other parameters also are displayed. One is the maximum intensity of the central peak, which is indicated by the pointer on the left ordinate axis; the other is the power enclosed by the maximum radius, which is indicate by the position of the pointer on the right hand ordinate axis.

Referring to FIG. 4, the near field monitor consists of a radius disc assembly 40 centred on the portion 1" of the laser beam 1 transmitted by the mirror 6. The radius disc assembly 40 includes a radius disc 41 which has a radial slit 42 in it which defines a radius of the input aperture of the near field monitor 15. On the periphery of the radius disc 40 there is a fiduciary mark 43 and a sensor 44 which sense the beginning of each scan of the beam 1" as the radius disc 41 is rotated. Mounted on the radius disc 41 is a scanning slit 45 which has six regularly spaced radial slits 46 and is arranged to rotate at three times the rate of the radius disc 41. The combined motion of the two discs 41 and 45 causes an aperture to pass sequentially along 18 regularly spaced radii of the entrance aperture of the near field monitor 15 for each rotation of the radius disc assembly 40. Any part of the beam 1" passing through the aperture produced by the movement of the combined slits 42 and 46 is directed by a lens 47 to a detector 48. A chopper wheel 49 is placed in front of the detector 48 and is arranged to rotate at such a rate in relation to the rotation of the radius disc assembly 40 that 16 samples along each radial sample are produced by that assembly.

The output from the near field monitor 15 also is digitised and processed by the microprocessor system 17. A typical three-dimensional plot of the output from the near field monitor 15 is shown in FIG. 5(a). FIG. 5(b) shows corresponding radial plots, two of which, approximately orthogonal to each other, are emphasised. Quantitative analysis of the output information from the near field monitor 15 gives the diameter of the beam 1", and hence the unfocussed laser beam 1, and its position in relation to the polar scanning matrix of the radius disc assembly 40. A control signal derived from this data by the microprocessor system 17 is used to alter the position of the input mirror 2.

Referring again to FIG. 1, the fraction 1''' of the laser beam 1 which is transmitted by the partially reflecting mirrors 6 and 14' is reduced in diameter by the final mirror 14 before entering the power monitor 16. Within the power monitor 16 are three detectors, which are not shown. The first is a 100 watt power meter disc, the second a pyroelectric detector having a removable polarising element or grid polariser and arranged to monitor transients or oscillations in the intensity of the laser beam to a frequency of 100 kH$_z$. The third detector is arranged to monitor mode beating to a frequency of 60 MH$_z$. The outputs from the second and third detectors are displayed on an oscilloscope or processed by a frequency analyser within the microprocessor unit 17. The output from the first detector is used to provide a control signal which is applied to a laser power supply system 19.

One application of the invention is in the continuous monitoring of a laser beam used in cutting and welding operations in a nuclear fuel reprocessing plant, for example in a fast reactor fuel reprocessing plant. The laser beam might be used for cutting through a portion of a wall of a transport canister containing a fast reactor fuel sub assembly, and subsequently dismantling the sub assembly by selected cuts of a wrapper about the sub assembly. It is essential that a closely controlled laser beam be used, particularly for the sub assembly dismantling, with the automatic control of the laser beam by use of a feedback circuit from the monitor, for example to control the power level of the laser beam.

I claim:

1. An apparatus for monitoring and controlling a beam of radiation from a laser, comprising means for directing at least a portion of the laser beam at a means for determining the transverse distribution of energy within the laser beam under far field conditions and producing a first control signal related thereto, means for directing a second portion of the laser beam at a means for determining the transverse distribution of energy within the laser beam under near field conditions and producing a second control signal related thereto, and means for directing a known proportion of the laser beam at a means for measuring the total power within the said proportion of the laser beam and producing a third control signal related thereto, means responsive to the first control signal to alter the postion of a mirror which forms part of an optical cavity within the laser structure, means responsive to the first and second control signals to direct the laser beam along a predetermined path, means responsive to the second control signal to maintain the divergence of the laser beam within predetermined limits, and means responsive to the third control signal to vary the amount of power supplied to the laser.

2. Apparatus according to claim 1 wherein the means for producing a first control signal related to the transverse distribution of energy in the laser beam includes means for extracting a proportion of the laser beam to form a first sample laser beam, means for bringing the sample laser beam to focus at an aperture in a detector plane, the aperture being centered on the axis of the sample laser beam, first and second optical wedges arranged to be rotated about the axis of the sample beam as a common axis of rotation and positioned sequentially so that their spices lie in the same plane but on opposite sides of the common axis of rotation, the apex angle of the first rotation wedge being less than that of the second wedge, and means whereby the axial separation of the wedges can be varied.

3. Apparatus according to claim 1 wherein the means for producing a second control signal related to the transverse distribution of energy within the laser beam under near field conditions includes means for extracting a second sample portion of the unfocussed laser beam and directing it at a rotatable disc centred on the axis of the second sample of the laser beam, and having a radial slit formed therein, defining an entrance aperture, a rotatable scanning slit disc having a plurality of regularly spaced radial slits around its periphery mounted eccentrically on the radius disc, means for rotating the scanning slit disc relative to the radius disc so as to cause an aperture created by the super position of the slits in the discs to scan along the slit in the radius disc as it is rotated, means for directing light passing through the said aperture to be incident upon a photodetector, and means for regularly interrupting the said light to provide a plurality of samples throughout each radial scan.

4. Apparatus according to claim 3 wherein the scanning slit disc has six regularly spaced slits and is arranged to rotate at three times the rate of the radius disc.

5. Apparatus according to claim 1 wherein the means for measuring the total power within the said proportion of the laser beam includes a power meter.

6. Apparatus according to claim 5 wherein there is included means for detecting and maintaining short-term variations in the intensity of the laser beam.

7. Apparatus according to claim 5 wherein there is included means for detecting and monitoring variations in the intensity of the laser beam arising from mode beating in the optical cavity of the laser.

* * * * *